July 10, 1928.

EL ROY L. PAYNE

GAS FURNACE

Filed June 3, 1926

INVENTOR.
El Roy L. Payne,
BY Arthur P. Knight and
Alfred W. Knight
ATTORNEYS

July 10, 1928.

EL ROY L. PAYNE

GAS FURNACE

Filed June 3, 1926  3 Sheets-Sheet 2

1,676,665

INVENTOR.
El Roy L. Payne,
BY Arthur P. Knight and
Alfred W. Knight
ATTORNEYS

July 10, 1928.
EL ROY L. PAYNE
GAS FURNACE
Filed June 3, 1926
1,676,665
3 Sheets-Sheet 3
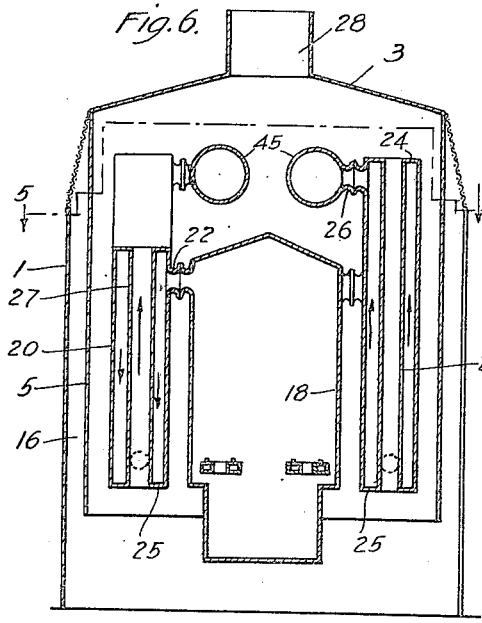
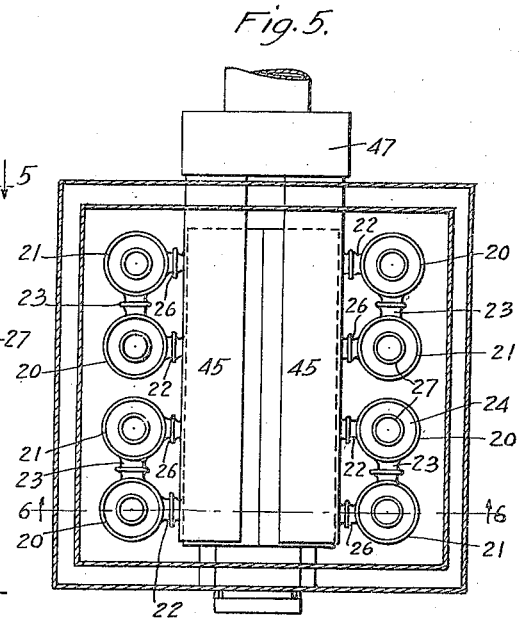
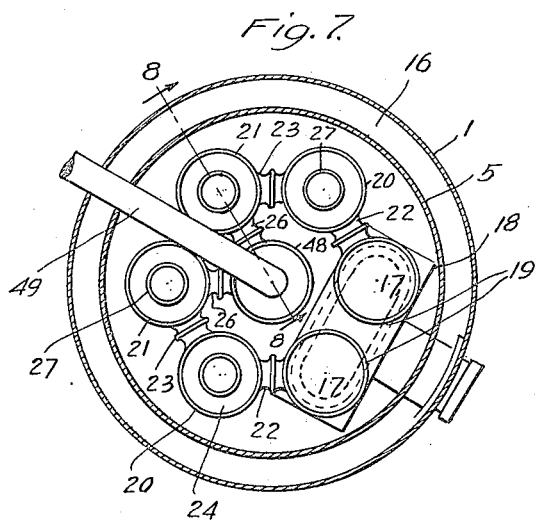
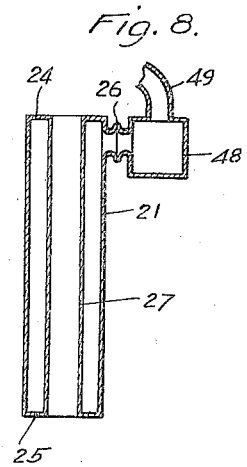
INVENTOR.
El Roy L. Payne,
BY Arthur P. Knight and
Alfred W. Knight
ATTORNEYS Patented July 10, 1928.

1,676,665

UNITED STATES PATENT OFFICE.

EL ROY L. PAYNE, OF BEVERLY HILLS, CALIFORNIA, ASSIGNOR TO PAYNE FURNACE AND SUPPLY COMPANY, OF BEVERLY HILLS, CALIFORNIA, A CORPORATION OF CALIFORNIA.

GAS FURNACE.

Application filed June 3, 1926. Serial No. 113,377.

This invention relates to furnaces using gas as a fuel for heating residences or other buildings and particularly to furnaces of the type in which the hot combustion products resulting from combustion of the gas are utilized to heat a body or current of fresh air, the resulting heated fresh air being supplied to the space to be heated while the combustion products after giving up their heat are discharged outside the building. The main object of the invention is to provide a furnace of this type having certain advantageous features of construction which result in more efficient heating of the air and increase the life of the furnace. A further object of the invention is to provide a heating unit which may be placed inside the furnace and which is of simple, rugged construction and at the same time provides for the most effective heat exchange between the hot products of combustion and the incoming fresh air.

In many furnaces of this type the fresh air is passed through a plurality of heating tubes and the hot products of combustion pass in a single body or current around or adjacent such tubes. Ordinarily no effective means are provided for distributing the current of hot products of combustion in such manner as to bring them into uniform contact with all parts of all the tubes and such products of combustion usually follow the shortest path through the furnace, leaving dead air pockets surrounding a considerable portion of the tubes. This results not only in ineffective heat exchange due to the fact that only a portion of the total surface of the tubes is used for heating, but also in the collection of water of condensation from the combustion gases on the cooler portions of the heating tubes, and such water together with sulphurous or other corrosive gases dissolved therein from the combustion gases corrode the iron tubes so that such tubes are soon eaten through and must be replaced. According to my invention I overcome this objection by providing definite restricted passages or paths for the incoming fresh air and also providing definite passages or paths for the products of combustion adjacent the air passages so as to cause the hot products of combustion to be effectively distributed over the heating surfaces surrounding or adjacent the fresh air passages and thus bring about uniform heating of the fresh air and maximum effectiveness of heat exchange due to utilization of the entire heating area, and at the same time prevent condensation of water vapor and consequent corrosion of the material of which the heat units is constructed, due to substantially uniform heating of all portions of the walls with which the hot products of combustion come into contact. With such a construction there is no chance for dead air pockets to form and consequently no cold portions on which condensation may occur. A further advantage of the invention is that the heating unit by which the above results are accomplished forms an integral self-supporting assembly which may be inserted and removed from the furnace if desired.

The accompanying drawings illustrate embodiments of my invention and referring thereto:

Fig. 5 is a horizontal section of a modified form of furnace, taken on line 5—5 in Fig. 6.

Fig. 6 is a section on line 6—6 in Fig. 5.

Fig. 7 is a horizontal section of another modification of the invention.

Fig. 8 is a partial section on line 8—8 in Fig. 7.

Figure 1:
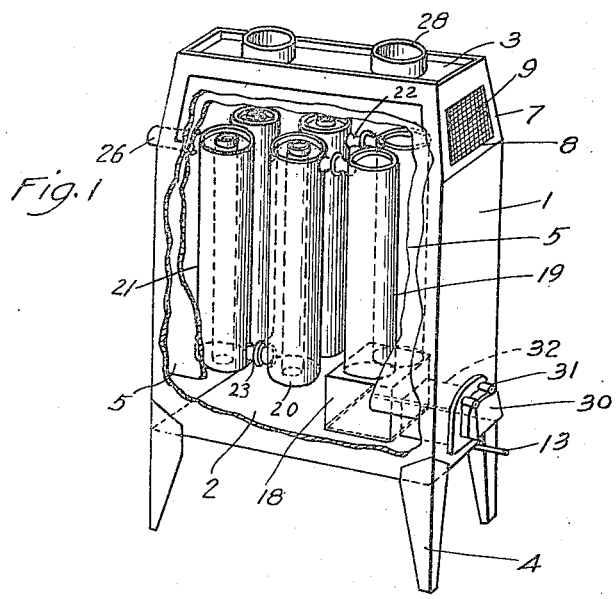
Fig. 1 is a perspective of a furnace containing a heating unit with two sets of parallel heat exchanging members.
Figure 2:
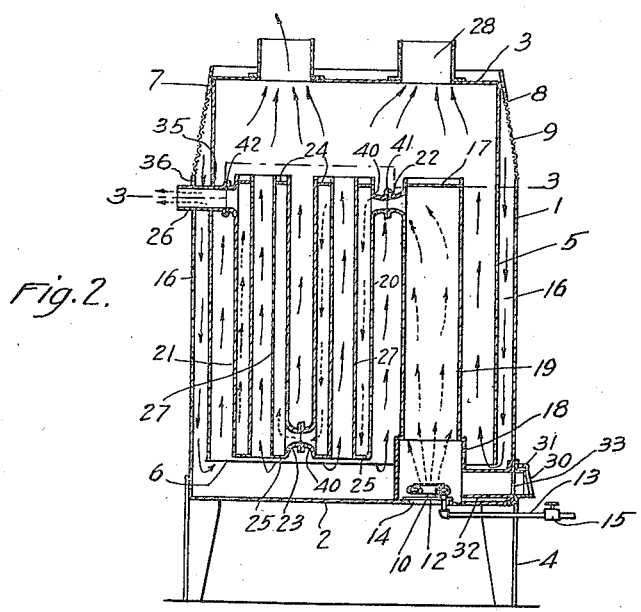
Fig. 2 is a vertical section of such a furnace.
Figure 3:
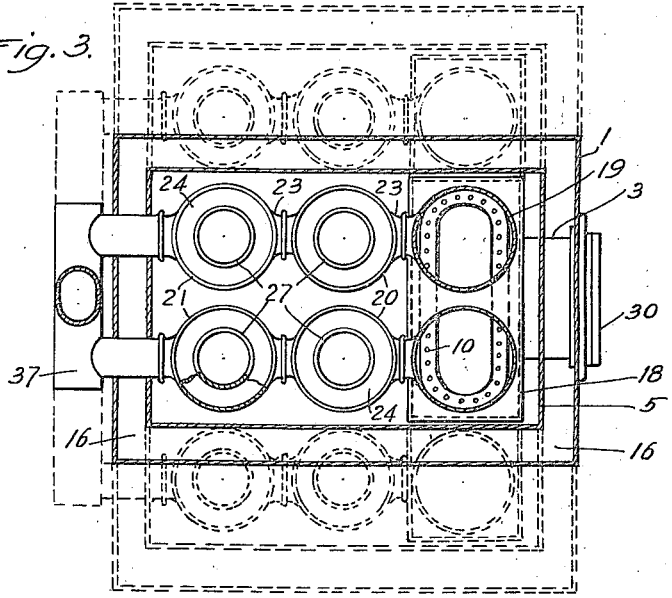
Fig. 3 is a horizontal section on line 3—3 in Fig. 2, also indicating the manner in which the unit may be increased in size as desired.

The furnace as shown in Figs. 1 to 3 of the drawings comprises an outer furnace casing 1 consisting of side, front, and rear walls, bottom 2 and top 3. Said casing may be mounted upon supporting legs 4. Within said outer casing and spaced from the walls thereof is an inner casing 5, which extends to near or somewhat above the bottom thereof and is open at its lower end as indicated at 6. Said inner flue may be connected to the outer casing at its upper end and the walls of said outer casing are preferably tapered or inclined outwardly for a short distance downwardly from their upper end as indicated at 7 so as to provide an air passage space 16 extending all around the furnace between the inner and outer casings. An air inlet opening 8 is provided in the inclined portion of each of said walls and a screen 9 may be provided to prevent entrance of foreign material through such openings. Inner casing 5 forms a depending apron to direct the fresh air admitted through openings 8 downwardly through passages 16 to the bottom of the furnace.

Gas burner means 10 is provided at the bottom of the furnace, being supported for example on supporting brackets 12 secured to the furnace casing. Gas supply means 13 is connected to said burner and an opening 14 is provided in bottom 2 below the burner for admission thereto of air for combustion of such gas. The gas supply means 13 may be provided with any suitable means for controlling the admission of gas to the burner, such means comprising either manually or automatically controlled valve means indicated at 15.

The heating unit for effecting heat exchange between the hot combustion gases and the incoming fresh air may comprise a rectangular housing or combustion chamber 18 fitting over the opening 14 and resting on the bottom 2 around said opening and having a plurality of vertical flues 19 connected thereto, preferably by welding, and extending upwardly therefrom, and a plurality of vertical flues 20 and 21 located beside the flues 19 and provided with alternating top and bottom connecting pipes 22 and 23. Flues 19 open into the combustion chamber at their lower ends and are closed at their upper ends as at 17, while flues 20 and 21 are closed at both their upper and lower ends as indicated at 24 and 25. There may be any number of sets of flues 19, 20, and 21 arranged side by side and in parallel manner, each of such sets being provided with separate connecting means 22 and 23 connecting them together so as to cause the hot gases to pass first upwardly in flues 19, then downwardly in flues 20, and then upwardly again in flues 21. For example there may be two of such sets as indicated in Figs. 1 and 3 or there may be four as indicated in dotted lines in Fig. 3, or any other number may be used, in order to obtain the desired heating capacity. While I have shown only two flues 20 and 21 in each set it is obvious that any desired number of such flues may be connected in series in similar manner. The last vertical flue in each set is provided with an outlet pipe 26, said pipe being in this case connected to the upper end of each flue 21.

Air passage means such as vertical tubes or pipes 27 are provided centrally within each flue 20 and 21, said tubes or pipes being open at their upper and lower ends so as to permit free passage of air therethrough. The space around the vertical flues 19, 20, and 21 and within the inner casing 5 affords further room for upward passage of air to be heated. Outlet openings 28 are provided at the top of casing 1, to which may be connected any suitable means for distributing or conveying the heated air to the desired place. For the purpose of viewing the flame at burner means 10, door 30 hinged at 31 may be placed at the front of the furnace and in line with said burner, and a sight passage 32 may extend forwardly from combustion chamber 18 at the level of said burner to the opening 33 which is normally closed by said door.

I prefer to make the vertical gas passage flues 19, 20, and 21 and also the inner air passage tubes 27 of circular cross-section. In this manner a much more uniform relation is maintained throughout the furnace, between the volume of hot gases and the volume of air to be heated, than when square or rectangular flues or tubes are employed or when round tubes are used inside of square flues. Uniform and efficient heating of the air is thus provided. Furthermore, the construction is greatly simplified by the use of round flues and tubes, since each one may be formed by simply bending a piece of sheet iron to cylindrical shape and welding along the adjoining edges. The provision of a heating unit consisting of cylindrical gas passage flues having cylindrical air passage tubes arranged centrally therein, therefore constitutes an important advantage of my invention.

The top and bottom connecting pipes 22 and 23 are preferably formed by simply flaring out the metal around an opening at the proper point in each flue 19, 20, or 21, so as to form a projecting neck member, as at 40, and the two adjacent neck members so formed are brought together and welded as at 41 to form the connecting neck 22 or 23. This provides a very simple means of connecting together the vertical flues. In a similar manner the last flue 21 of each set is provided with a flared neck member 42 which is welded onto the corresponding outlet connection 26.

The heating unit, comprising combustion chamber 18 and flues 19, 20, and 21 together with the connecting pipes therefor, is thus seen to constitute an integral or permanently connected unit and may be supported within the casing 1 solely by means of the lower end of combustion chamber 18 resting on the bottom of said casing as above described and by means of outlet pipes 26 which fit within openings 35 and 36 in the rear wall of inner casing 5 and furnace casing 1. The construction of the furnace is thus made very simple and the heating unit, the various parts of which are welded together so as to form an integral member, may be readily inserted within the casing or removed therefrom by tilting slightly, the top 3 of the furnace casing being of course removable for this purpose. After insertion of the heating unit within the casing, with the outlet connections 26 projecting through the openings in the rear wall thereof, outlet flue 37 may be connected to said connections, for example by welding or otherwise, for the purpose of conducting away the waste gases after the same have given up their heat to the air.

In operation, when the gas is turned on and a flame is established at burner means 10, the combustion of such gas takes place in combustion chamber 18, the air for supporting such combustion being drawn in through opening 14. The resulting hot combustion gases follow definite parallel paths through the furnace as indicated by the dotted arrows in Fig. 2. Such gases pass first upwardly through the combustion chamber 18 and flues 19, then in parallel through connecting pipes 22, flues 20, connecting pipes 23, flues 21 and outlet pipes 26 of all the sets of such flues and connecting pipes in the heating unit. The air within the inner casing 5 and surrounding flues 19, 20, and 21 and also within the inner tubes 27 is thus heated and an upward draft produced by which such heated air is carried out through openings 28 to the place to be heated. Fresh air is thus drawn in through the screened openings 8 and passes downwardly in the space 16 between the inner and outer casing on all four sides of the furnace where it is subjected to a preliminary heating and then passes upwardly within inner casing 5 and through tubes 27 as above described and as indicated in full arrows in Fig. 2.

It will be seen that with such a construction all of the incoming air is directed into close contact with the wall of a flue or tube which is heated by the hot combustion gases and there is no formation of dead air pockets within the furnace. The hot combustion gases, instead of being allowed to pass in a single stream through the furnace, are separated into a plurality of streams, and each of such streams is caused to pass in heat interchanging relation to a stream of air to be heated. Not only is a maximum effectiveness of heat exchange thus obtained, but the condensation of water vapor in the cooler parts of the furnace resulting from dead air pockets is also prevented and the objectionable corrosion of the pipes is thus eliminated.

Figure 4:
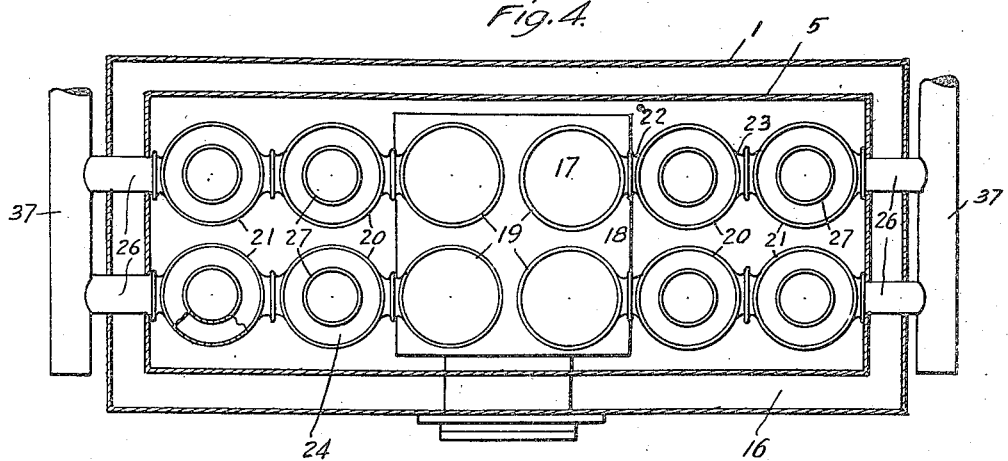
Fig. 4 is a horizontal section showing a modified arrangement of the heat exchanging members.

A slightly modified arrangement of the heating flues is shown in Fig. 4. In this case four vertical flues 19 are connected to the combustion chamber 18, beneath which is located the gas burner. A set of flues 20 and 21, each provided with inner air passage tubes 27, is connected to each flue 19, two of such sets extending to the left and two to the right from the central tubes 19. The outlet connections 26 from the left-hand sets of flues extend through the left wall of the furnace and those from the right-hand set of flues extend through the right wall of the furnace. The construction of this type of furnace may be otherwise substantially the same as above described.

Another adaptation of the invention is shown in Figs. 5 and 6. In this case the combustion chamber 18, comprises a rectangular box or housing extending upwardly within the furnace casing to about the level of the tops of the flues 20 to which it is connected by connecting means 22, thus dispensing with the flues 19. Each flue 20 is connected as before at its lower end by connecting means 23 to a flue 21. Flues 21 also extend adjacent the combustion chamber and are arranged alternately with flues 20. Said flues 21 extend upwardly somewhat above the tops of flues 20 and are connected by outlet connections 26 to horizontal outlet headers or manifolds 45 which extend longitudinally of the furnace and above combustion chamber 18. Said outlet headers may extend through the furnace casing at one end and may be connected to outlet flue 47 for carrying away the waste gases. The flues 20 and 21 are preferably oppositely disposed at the two sides of combustion chamber 18, so that the connections 22 open alternately from the two sides of said combustion chamber, and outlet connections 26 enter the outlet headers alternately at opposite sides thereof, so as to provide for maintenance of uniform draft conditions throughout the furnace. The alternate arrangement of the outlet connections to outlet headers 45 also permits said headers to be turned end for end if desired in assembling the furnace, so as to provide for connection of the outlet pipe 47 at either the front or back of the furnace. The other features of the construction are in this case substantially the same as before.

In Figs. 7 and 8 I have shown the adaptation of my invention in connection with a circular furnace casing. Both the outer casing 1 and inner casing 5 are in this case cylindrical, providing an annular air passage space 16 between said casings. Combustion chamber 18 is provided, from which the two flues 19 extend upwardly to the level of the top of the two flues 20 which are connected thereto at their upper ends by connecting means 22. Each flue 20 is connected at its lower end by connecting means 23 to a flue 21, the two sets of flues 20 and 21 extending in opposite directions around the interior of the furnace casing so as to provide a circular arrangement of the flues to conform to the shape of the casing. The two flues 21 may be connected at their upper ends by outlet connections 26 to a central outlet header 48, whence outlet pipe 49 leads out through the side or top of the furnace casing for carrying away the waste gases.

It will be seen that in all of the forms of the invention above described, definite restricted passages are provided through which both the gas and air pass and that both the gas passage flues and the inner air passages are cylindrical in shape, so that a maximum uniformity and efficiency of heat interchange is provided for. Furthermore, an integral heating unit is provided by welding all parts thereof together, and such heating unit may be readily inserted within the furnace casing and is self-supporting when so inserted.

It will also be seen that in all the forms of the invention which I have shown, each set of gas passage flues 20 and 21, together with the connecting passage means 23 between the lower ends thereof and the connecting neck portions 40 and 42 at the upper ends of the respective flues, and the central air passage tubes 27 within said flues, constitutes an element which is substantially the same in all forms. These elements may be assembled in different arrangements and in any desired number so as to provide a heating unit having the necessary heating capacity.

I claim:

1. A gas furnace comprising a furnace casing, a gas burner near the bottom of such casing, a heating unit mounted within said casing, said heating unit comprising a combustion chamber above said gas burner and in position to receive hot combustion gases therefrom, a series of vertical flues closed at both ends, a single pipe connecting the nearest of said flues to said combustion chamber, a single pipe connecting each flue to the next flue of the series, said connecting pipes being located alternately adjacent the upper and lower ends of said flues so as to cause said combustion gases to pass first upwardly through said combustion chamber and then alternately downwardly and upwardly in said flues, and means defining a single air passage extending centrally within each of said flues and open at both ends, and said furnace also comprising means for admitting air to the bottom of said furnace casing so as to permit said air to pass upwardly through said air passage means and around said combustion chamber and flues and to be heated thereby.

2. In a gas furnace, a heating unit comprising housing means for permitting combustion of gas therein, and for conducting the products of such combustion upwardly, a plurality of vertical gas passage flues closed at both ends by means of end members integrally secured thereto, alternate top and bottom connecting passage means for connecting said gas passage flues to said combustion product conducting means and to one another, and air passage tubes disposed centrally within said last-named vertical flues and open at both ends, said connecting passage means being integrally connected to the side walls of said combustion product conducting means and of said vertical flues, and said air passage tubes being integrally connected to the ends of said flues.

3. A construction as set forth in claim 2, there being a plurality of sets of said vertical gas passage flues, each of said sets comprising a plurality of flues connected in series and all of the sets being connected in parallel to said combustion product conducting means.

4. A construction set forth in claim 2, said vertical gas passage flues and said air passage tubes being cylindrical and being concentrically disposed.

5. A construction as set forth in claim 2, said top and bottom connecting passage means consisting of opposing flared neck portions in the walls of adjacent flues, said neck portions being integrally secured together to form said passage means.

6. A gas furnace comprising a furnace casing having lateral walls and top and bottom walls, and having an opening in its bottom wall; burner means positioned above said opening in the bottom wall; and a heating unit comprising housing means extending upwardly from said burner means for permitting combustion therein and for conducting the products of such combustion upwardly, a plurality of vertical gas passage flues closed at their upper and lower ends, alternate top and bottom connecting pipes integrally connecting the nearest of said gas passage flues to said combustion product conducting means and integrally connecting said gas passage flues to one another in series, air passage tubes disposed centrally within said vertical flues and open at both ends and integrally secured to the ends of said flues, and an outlet pipe integrally connected to the last gas passage flue in said series; said outlet pipe fitting within an opening in a lateral wall of said furnace casing to partially support the heating unit within said casing and said housing means resting at its lower end upon the bottom wall of said casing to further support said heating unit.

7. A construction as set forth in claim 6, there being a plurality of sets of said vertical gas passage flues, each of said sets comprising a plurality of flues each provided with a central air passage tube, all the flues of each set being connected in series and all of the sets being connected in parallel to said combustion product conducting means, the last flue in each set having an outlet pipe connected thereto and fitting within an opening in a lateral wall of the furnace, the engagement of said outlet pipes with the wall of the furnace and of said housing means with the bottom of the furnace constituting the sole means of supporting the heating unit within the furnace.

8. In a furnace, a heating element comprising two vertical cylindrical flues closed at both ends, a single cylindrical tube extending centrally within and throughout the length of each flue and open at both ends, connecting passage means between said flues adjacent the lower ends thereof, and connecting passage means adjacent the upper end of each flue for inflow and outflow respectively of gases.

9. A gas furnace comprising a furnace casing, a gas burner near the bottom of said casing, a combustion chamber within said casing and extending upwardly from said burner, a plurality of heating elements within said casing, and means connecting all of said heating elements in parallel to the upper portion of said combustion chamber; each of said heating elements comprising a series of vertical gas conducting flues, gas passage means connecting all the flues of each element in series alternately at the bottom and top thereof, and a single air passage tube extending centrally within each of said gas conducting flues.

In testimony whereof I have hereunto subscribed my name this 25th day of May, 1926.

EL ROY L. PAYNE.